United States Patent
Nakagawa

(10) Patent No.: US 10,294,366 B2
(45) Date of Patent: May 21, 2019

(54) CRYSTALLINE POLYAMIDE RESIN COMPOSITION

(71) Applicant: TOYOBO CO., LTD., Osaka (JP)

(72) Inventor: Tomohide Nakagawa, Shiga (JP)

(73) Assignee: TOYOBO CO., LTD., Osaka (JP)

( * ) Notice: Subject to any disclaimer, the term of this patent is extended or adjusted under 35 U.S.C. 154(b) by 57 days.

(21) Appl. No.: 15/310,175

(22) PCT Filed: May 14, 2015

(86) PCT No.: PCT/JP2015/063881
§ 371 (c)(1),
(2) Date: Nov. 10, 2016

(87) PCT Pub. No.: WO2015/174488
PCT Pub. Date: Nov. 19, 2015

(65) Prior Publication Data
US 2017/0137623 A1 May 18, 2017

(30) Foreign Application Priority Data
May 16, 2014 (JP) .................... 2014-102052

(51) Int. Cl.
| | |
|---|---|
| *C08L 77/00* | (2006.01) |
| *C08L 77/06* | (2006.01) |
| *C08K 7/06* | (2006.01) |
| *C08L 23/26* | (2006.01) |
| *E05F 5/06* | (2006.01) |
| *C08L 51/06* | (2006.01) |
| *C08L 77/02* | (2006.01) |
| *C08L 25/14* | (2006.01) |

(52) U.S. Cl.
CPC ............. *C08L 77/06* (2013.01); *C08K 7/06* (2013.01); *C08L 23/26* (2013.01); *C08L 51/06* (2013.01); *C08L 77/02* (2013.01); *E05F 5/06* (2013.01); *C08L 25/14* (2013.01); *C08L 2205/025* (2013.01); *C08L 2205/03* (2013.01); *E05Y 2900/531* (2013.01)

(58) Field of Classification Search
CPC ....................................................... C08L 77/00
USPC ................................................. 525/420, 426
See application file for complete search history.

(56) References Cited

U.S. PATENT DOCUMENTS

| | | |
|---|---|---|
| 2003/0055154 A1 | 3/2003 | Urata |
| 2005/0131147 A1 | 6/2005 | Brule |
| 2006/0111500 A1* | 5/2006 | Harada .................. C08L 77/00 524/445 |
| 2010/0093936 A1* | 4/2010 | Kubota .................. C08L 77/00 525/190 |
| 2015/0240079 A1* | 8/2015 | Oya ........................ C08K 3/22 524/432 |

FOREIGN PATENT DOCUMENTS

| | | | |
|---|---|---|---|
| JP | 57-67658 | 4/1982 | |
| JP | 8-283494 | 10/1996 | |
| JP | 2002-226703 | 8/2002 | |
| JP | 2002-371197 | 12/2002 | |
| JP | 2004-250707 | 9/2004 | |
| JP | 2006-56983 | 3/2006 | |
| JP | 2006-56984 | 3/2006 | |
| JP | 2008-106265 | 5/2008 | |
| JP | 2009-298869 | 12/2009 | |
| JP | 2011-80029 | 4/2011 | |
| JP | 2013-95791 | 5/2013 | |
| WO | WO 2014/051120 A1 * | 4/2014 | ............. C08L 77/06 |

OTHER PUBLICATIONS

International Search Report dated Jul. 21, 2015 in International Application No. PCT/JP2015/063881.
Osamu Fukumoto: "Lecture on Plastic Materials [16], Polyamide Resin", published by Nikkan Kogyo Shimbun (1970), with English translation.

* cited by examiner

*Primary Examiner* — Michael J Feely
(74) *Attorney, Agent, or Firm* — Wenderoth, Lind & Ponack, L.L.P.

(57) ABSTRACT

The present invention is a crystalline polyamide resin composition, comprising 100 parts by mass of a crystalline polyamide resin and 1 to 10 part(s) by mass of a modified polyolefin resin. The crystalline polyamide resin composition of the present invention can provide a molded product which has so excellent sliding durability that changes in surface appearance against repeated slidings for tens of thousands times with high load are small and which has excellent mechanical strength and moldability, while keeping excellent characteristics inherent to a crystalline polyamide resin.

3 Claims, No Drawings

CRYSTALLINE POLYAMIDE RESIN COMPOSITION

TECHNICAL FIELD OF THE INVENTION

The present invention relates to a crystalline polyamide resin composition containing crystalline polyamide resin having high relative viscosity, modified polyolefin resin and carbon fiber. To be more specific, the present invention relates to a crystalline polyamide resin composition in which specific gravity is light, strength, rigidity and moldability are excellent and sliding durability is good. It is particularly suitable for mechanism parts requiring sliding characteristics such as door checker and gear for automobiles.

BACKGROUND ART

Although sliding characteristics of polyamide resin are excellent due to its crystallinity, many investigations have been conducted from old time already in order to achieve more excellent sliding characteristics. Solid lubricants such as molybdenum disulfide, graphite and fluorine resin and liquid lubricants such as various kinds of lubricating oil and silicone oil have been investigated as main improving agents for sliding characteristics (for example, Non-Patent Document 1).

As to a solid lubricant among those improving agents for sliding characteristics, it is necessary to compound large amount of a solid lubricant when sliding characteristics are to be further improved in a resin inherently having excellent sliding characteristics such as polyamide resin. As a result, tenacity of a polyamide resin acting as abase is significantly lowered and evaluation standards of molded parts for automobiles such as heat cycle cannot be cleared. Moreover, it is not preferred from economical viewpoint because large amount of expensive solid lubricant is compounded. On the other hand, liquid lubricant can impart highly effective sliding characteristics to the resin such as engineering plastic in a relatively small amount. However, in many cases, compatibility with the resin acting as a base is bad and there are many cases wherein surface of a molded product is polluted with such a liquid lubricant. Therefore, in a product wherein sliding characteristics are improved using such a liquid lubricant, its use is limited.

Instead of compounding various kinds of lubricants as such, it has been proposed to use a polyamide resin of high viscosity wherein molecular weight of the polyamide resin is made significantly high so as to improve the mechanical characteristics and also to improve the sliding characteristics such as low friction and low abrasion (for example, Patent Documents 1 and 2). It has been also proposed that, if necessary, a low-molecular compound such as higher fatty acid, higher fatty acid ester or higher fatty acid amide is added as an improving agent for moldability.

PRIOR ART DOCUMENTS

Patent Documents

Patent Document 1: Japanese Patent Application Laid-Open (JP-A) No. 2006-56983
Patent Document 2: Japanese Patent Application Laid-Open (JP-A) No. 2006-56984

Non-Patent Documents

Non-Patent Document 1: Osamu Fukumoto: "Lecture on Plastic Materials [16], Polyamide Resin" published by Nikkan Kogyo Shimbun (1970)

However, when a polyamide resin of high viscosity is used, although sliding characteristics of the product are improved, deformation upon loading is not improved. Especially when sliding is done with high load at low speed, it is necessary that the deformation upon loading is suppressed to an extent of lower than a predetermined level. In order to reduce the deformation of a highly viscous polyamide upon loading, it is necessary to increase its elastic modulus in bending. Although the elastic modulus in bending can be increased by addition of an inorganic filler thereto, the resulting fluidity, appearance, etc. become very bad thereby. Therefore, it is not possible to add large amount of the inorganic filler. In addition, when an inorganic filler is added in large amounts, specific gravity of the resin becomes heavy whereby that is not preferred.

DISCLOSURE OF THE INVENTION

Problem that the Invention is to Solve

Under such circumstances, the problem to be solved by the present invention is to provide an excellent polyamide resin composition wherein high mechanical characteristics or, particularly, good elastic modulus in bending are retained and excellent sliding durability is expressed and, at the same time, low specific gravity is also achieved, even if a polyamide resin of high viscosity is used.

Means for Solving the Problem

The present inventors have conducted studies eagerly for solving the above problem. As a result, they have found that the high mechanical strength and excellent sliding characteristics and moldability etc. can be achieved when specific amounts of carbon fiber and a modified polyolefin resin wherein compatibility with a polyamide resin is improved are compounded with a composition comprising, as a base, a crystalline polyamide having the viscosity of more than a predetermined level. Consequently, they have accomplished the present invention.

Thus, the present invention has the following constitutions.

(1) A crystalline polyamide resin composition, characterized in that, to 100 parts by mass of a crystalline polyamide resin consisting of 50 to 100% by mass of a crystalline polyamide resin (A) wherein relative viscosity measured in 96% sulfuric acid is 3.0 or more and 50 to 0% by mass of a crystalline polyamide resin (B) wherein melting point is lower than melting point of the crystalline polyamide resin (A) by 20° C. or more and relative viscosity measured in 96% sulfuric acid is 3.6 or less, followings are compounded:

1 to 10 part(s) by mass of a modified polyolefin resin (C) having a reactive functional group capable of reacting with terminal group and/or main chain amide group of the polyamide resin, 1 to 15 part(s) by mass of carbon fiber (D) and 0 to 5 part(s) by mass of a styrene-glycidyl methacrylate copolymer (E).

(2) The crystalline polyamide resin composition according to (1), wherein the modified polyolefin resin (C) having a reactive functional group capable of reacting with terminal group and/or main chain amide group of the polyamide resin is a modified polyethylene resin.

(3) The crystalline polyamide resin composition according to (1) or (2), wherein the composition is used for a door checker.

Advantages of the Invention

In accordance with the present invention, it is now possible to provide a crystalline polyamide resin composition having good moldability and excellent sliding durability and particularly having such characteristics that specific gravity of a molded product is light and deformation upon loading is little, without deteriorating the excellent mechanical characteristics or, particularly, shock resistance, heat resistance and resistance to chemicals which are inherent to a crystalline polyamide resin. Accordingly, the composition of the present invention can be used in broad areas such as automobile parts or, particularly, for mechanism part wherein mechanical strength and sliding characteristics are necessary such as door checker and gear. Therefore, the present invention greatly contributes to industry.

BEST MODE FOR CARRYING OUT THE INVENTION

The present invention will now be more specifically illustrated as follows.

With regard to the crystalline polyamide resin (A) wherein relative viscosity measured in 96% sulfuric acid is 3.0 or more and the crystalline polyamide resin (B) wherein melting point is lower than melting point of the crystalline polyamide resin (A) by 20° C. or more and relative viscosity measured in 96% sulfuric acid is 3.6 or less of the present invention, there is no particular limitation therefor so far as they are crystalline polymers having an amide bond (—NHCO—) in the main chain. Examples thereof are crystalline polyamide resin such as polyamide 6 (NY6), polyamide 66 (NY66), polyamide 46 (NY46), polyamide 11 (NY11), polyamide 12 (NY12), polyamide 610 (NY610), polyamide 612 (NY612), poly-m-xylylene adipamide (MXD6), a polymer of hexamethylenediamine-terephthalic acid (6T), a polymer of hexamethylenediamine-terephthalic acid with adipic acid (66T), a copolymer of hexamethylenediamine-terephthalic acid with ε-caprolactam (6T/6), a polymer of trimethylhexamethylene-diamine-terephthalic acid (TMD-T), a copolymer of m-xylylenediamine with adipic acid and isophthalic acid (MXD-6/I), a copolymer of trihexamethylenediamine with terephthalic acid and ε-caprolactam (TMD-T/6) and a copolymer of diaminodicyclohexylenemethane (CA) with isophthalic acid and lauryllactam although they are non-limitative.

As to the crystalline polyamide resin (A) according to the present invention, the particularly preferred one is polyamide 66. Relative viscosity of the crystalline polyamide resin (A) of the present invention is particularly important. Generally, in case the relative viscosity of the polyamide resin is measured, there are three measuring methods depending on kinds of solvents used for dissolving the polyamide resin which are m-cresol, 96% sulfuric acid (96% by mass sulfuric acid) and 90% formic acid. The relative viscosity of the crystalline polyamide resin (A) in the present invention is measured using 96% sulfuric acid solution (concentration of polyamide resin: 1 g/dl; temperature: 25° C.). The resulting relative viscosity of the crystalline polyamide resin (A) in the present invention is 3.0 or more, preferably 3.1 to 5.0, and more preferably 3.1 to 4.7.

On the other hand, as to the crystalline polyamide resin (B) according to the present invention, the particularly preferred one is polyamide 6. Relative viscosity of the crystalline polyamide resin (B) of the present invention is also measured using 96% sulfuric acid solution (concentration of polyamide resin: 1 g/dl; temperature: 25° C.). The resulting relative viscosity of the crystalline polyamide resin (B) of the present invention is 3.6 or less, preferably 2.0 to 3.6, and more preferably 2.2 to 3.3.

When the relative viscosity of the crystalline polyamide resin (A) is less than 3.0, entangling of molecules is insufficient because of low molecular weight whereby the sliding characteristics become bad. The reason why preferred lower limit is stipulated for the relative viscosity of the crystalline polyamide resin (B) is the same as well. When the relative viscosity of the crystalline polyamide resin (B) is more than 3.6, the viscosity is too high whereby fluidity necessary for injection molding cannot be secured. The reason why preferred upper limit is stipulated for the relative viscosity of the crystalline polyamide resin (A) is the same as well.

In order to improve the insufficient fluidity during molding process, it is necessary to add a polyamide resin having relatively high fluidity at the molding temperature of the crystalline polyamide resin (A) which is the main ingredient. Accordingly, it is preferred to add a crystalline polyamide (B) wherein the melting point is lower by 20° C. or more. With regard to a compounding rate of the crystalline polyamide resin (A) with the crystalline polyamide resin (B), it is 50 to 0% by mass of the crystalline polyamide resin (B) to 50 to 100% by mass of the crystalline polyamide resin (A) (the sum of the crystalline polyamide resin (A) and the crystalline polyamide resin (B) is 100% by mass). When the rate of the crystalline polyamide resin (A) is lower than this range, melting point of the resulting system greatly lowers and the composition melts due to frictional heat during sliding whereupon no excellent sliding characteristics can be achieved.

Hereinafter, the crystalline polyamide resin (A) and the crystalline polyamide resin (B) will be referred to as "the crystalline polyamide resin" as a group.

In the present invention, melting points of the crystalline polyamide resin (A) and the crystalline polyamide resin (B) can be measured by a differential scanning calorimeter (DSC). The melting point obtained by a differential scanning calorimeter is endothermic peak temperature upon rising the temperature. Detailed method for measuring the melting point is in accordance with a method mentioned in the following item for Examples.

The modified polyolefin resin (C) according to the present invention is prepared by modifying the following polyolefin. Examples thereof are olefin resins such as high-density polyethylene, low-density polyethylene, ultrahigh-molecular-weight polyethylene, linear low-density polyethylene, polypropylene, poly(l-butene) and poly(4-methylpentene). The most preferred one among those polyolefin resins is high-density polyethylene.

It is necessary that the polyolefin resin as such has a reactive functional group capable of reacting with terminal group and/or main chain amide group of the polyamide resin so as to improve the compatibility with the polyamide resin. As to the functional group capable of reacting with a polyamide resin, specific examples thereof are carboxylic acid group, acid anhydride group, epoxy group, oxazoline group, amino group and isocyanate group. Among them, an acid anhydride group is particularly preferred since it exhibits high reactivity with the polyamide resin. Compounding amount of the modified polyolefin resin (C) to 100 parts by mass of the crystalline polyamide resin is 1 to 10 part(s) by mass, preferably 1 to 8 part(s) by mass, and more preferably 2 to 6 parts by mass.

With regard to the carbon fiber (D) used in the present invention, there is no particular limitation therefor so far as fiber diameter is 4 to 10 μm and tensile strength is 3.0 to 8.0

GPa. As to a process for producing the same, there is no particular limitation therefor so far as it is a publicly disclosed means. In order to enhance the mechanical characteristics, carbon fiber of a PAN type is preferred. As to the form of the carbon fiber used in a melting/kneading process, it is preferred to be a chopped strand. As to the specific form of the short fiber in fiber bundles after bundling, carbon fiber wherein fiber diameter is 4 to 6 μm and tensile strength is 5 to 6 GPa, or carbon fiber wherein fiber diameter is 6 to 8 μm and tensile strength is 3 to 4 GPa is common. Preferred one is chopped strand prepared by treating the fiber bundle as such with a bundling agent or a coupling agent followed by cutting into a predetermined length. The common cut length is 3.0 to 10.0 mm.

Compounding amount of the carbon fiber (D) to 100 parts by mass of the crystalline polyamide resin is 1 to 15 part(s) by mass. When the compounding amount of the carbon fiber (D) is less than the above range, deformation upon load becomes too much and improving effect for abrasion characteristics becomes small. On the contrary, when the compounding amount of the carbon fiber (D) is more than the above range, damage is applied to the sliding object due to exposure of the fiber whereby the sliding characteristics as the parts are deteriorated. The compounding amount of the carbon fiber (D) to 100 parts by mass of the crystalline polyamide resin is preferred to be 2 to 10 parts by mass, and more preferred to be 3 to 8 parts by mass.

The styrene-glycidyl methacrylate copolymer (E) used in the present invention contains two or more glycidyl groups per molecule as the functional group capable of reacting with amino group or carboxyl group in the polyamide resin. This is preferred in view of introduction of partial cross-linking into the entire resin due to the quickness of the reaction exhibited by the functional group. As a result of the effect of the reactive compound, molecular chain is extended by the reaction with the amino group or the carboxyl group in the polyamide resin during melting and extrusion process whereby it is now possible to achieve high resistance to friction, fatigue, compression, etc.

With regard to the styrene-glycidyl methacrylate copolymer (E), its preferred amount is chosen depending upon the viscosity of the crystalline polyamide resin (A) and/or the crystalline polyamide resin (B). An object of addition of the ingredient (E) is to conduct the extension of the chain of the crystalline polyamide resin for improving the sliding characteristics within such a range wherein the injection molding is possible. Accordingly, it is preferred to add 0 to 5 part(s) by mass of the ingredient (E) to 100 parts by mass of the crystalline polyamide resin. When molecular weight(s) of the crystalline polyamide resin (A) and/or the crystalline polyamide resin (B) is/are optimum, addition of the ingredient (E) may not be necessary. When more than 5 parts by mass of the ingredient (E) is added, viscosity and molecular weight increase too much and the injection molding becomes difficult. Accordingly, the above range is preferred in view of retention of the injection moldability. When the relative viscosity of the crystalline polyamide resin (A) is within a range of 3.0 to 3.5, it is preferred to add 0.5 to 5 part(s) by mass of the ingredient (E) to 100 parts by mass of the crystalline polyamide resin.

As to the styrene-glycidyl methacrylate copolymer (E), its specific examples are a copolymer of styrene/methyl methacrylate/glycidyl methacrylate, a copolymer of styrene/butyl methacrylate/glycidyl methacrylate, a copolymer of styrene/butadiene/glycidyl methacrylate and a copolymer of styrene/isoprene/glycidyl methacrylate. Any of them may be used. It is also and of course possible to use a plurality of the copolymers by mixing them. Preferably, the styrene-glycidyl methacrylate copolymer (E) contains 2 to 30 molar % of glycidyl methacrylate. In that case, a copolymer consisting of 20 to 98 molar % of a vinyl aromatic monomer (X), 2 to 30 molar % of glycidyl alkyl (meth)acrylate (Y) and 0 to 78 molar % of alkyl (meth)acrylate (Z) is preferred. More preferred one is a copolymer consisting of 25 to 96 molar % of (X), 4 to 29 molar % of (Y) and 0 to 71 molar % of (Z). Since the composition as such affects the concentration of the functional group contributing to the reaction with the crystalline polyamide resin, it is necessary to be appropriately controlled as mentioned above.

When the adding amount of glycidyl methacrylate is less than 2 molar %, it is not possible to fully achieve an improving effect for sliding characteristics as a result of the chain extension being proportional to the adding amount. On the other hand, addition of large amount of glycidyl methacrylate for the chain extension lowers the mechanical characteristics. When the adding amount of glycidyl methacrylate is more than 30 molar %, reactivity is too high causing local rise of the viscosity whereby gelling happens. Accordingly, the fluidity is significantly deteriorated and the retention stability becomes very bad. In order to enhance the sliding characteristics without deteriorating the fluidity and mechanical characteristics, the adding amount of glycidyl methacrylate is preferred to be 2 to 30 molar %.

An improving agent for shock resistance and/or an inorganic filler may be added, if necessary, to the crystalline polyamide resin composition of the present invention within such an extent that the object of the present invention is not deteriorated thereby. As to the improving agent for shock resistance, there may be specifically exemplified a styrene-type thermoplastic elastomer such as a block copolymer of styrene/butadiene/styrene (SBS), a block copolymer of styrene/isoprene/styrene (SIS), a block copolymer of styrene/ethylene.butylene/styrene (SEBS), a block copolymer of styrene/ethylene.propylene/styrene (SEPS), a block copolymer of styrene/ethylene.amylene/styrene (vinyl SEPS) and a copolymer of styrene/ethylene/butylene (HSBR) and an olefin-type thermoplastic elastomer such as a block copolymer of ethylene/propylene (EPR) and a copolymer of ethylene/propylene/diene (EPDM). Among the thermoplastic elastomers as such, the particularly preferred one is SEBS.

It is preferable that the improving agent for shock resistance as such has a reactive functional group capable of reacting with terminal group and/or main chain amide group of the polyamide resin so as to improve the compatibility with the polyamide resin. As to the functional group capable of reacting with a polyamide resin, specific examples thereof are carboxylic acid group, acid anhydride group, epoxy group, oxazoline group, amino group and isocyanate group. Among them, an acid anhydride group is particularly preferred since it exhibits high reactivity with the polyamide resin.

As to the inorganic filler, there may be exemplified talc, wollastonite, clay, alumina, kaolin, mica, calcium carbonate, barium sulfate, etc. Among them, the particularly preferred one is wollastonite. In order to improve the adhesion to the polyamide resin, to prevent the self-aggregation and to make the dispersion upon kneading better, the inorganic filler as such may be subjected to a surface treatment with silica alumina or with an aminosilane coupling agent.

It is also possible upon necessity to add heat-resisting stabilizer, antioxidant, ultraviolet preventer, light stabilizer, lubricant, crystal nucleating agent, mold-releasing agent, antistatic agent, flame retardant, pigment, dye, etc. to the crystalline polyamide resin composition of the present invention.

In the crystalline polyamide resin composition of the present invention, the above-mentioned ingredients (A), (B), (C), (D) and (E) are preferred to occupy in an amount of 95% by mass or more, and more preferred to occupy in an amount of 98% by mass or more, in total.

There is no particular limitation for a process of producing the crystalline polyamide resin composition of the present invention. Although a common uniaxial extruder, biaxial extruder, pressurized kneader, etc. may be used as a kneader, a biaxial kneader is particularly preferred in the present invention. As one of the embodiments, the ingredients (A), (B), (C) and (D) are mixed together, if necessary, with the ingredient (E) as well as with an improving agent for shock resistance, an inorganic filler, etc., poured into a biaxial extruder and uniformly kneaded whereupon the crystalline polyamide resin composition can be produced. As to another embodiment, the ingredients (A), (B) and (C) are mixed together, if necessary, with the ingredient (E) as well as with an improving agent for shock resistance, an inorganic filler, etc. and poured into a biaxial extruder and then the ingredient (D) in directly added to a melted resin using a side feed during the course of the extruder followed by uniform kneading whereupon the crystalline polyamide resin composition can be produced. When it is important to suppress the breakage of the carbon fiber so as to achieve higher strength, it is preferred that the carbon fiber (D) is poured using a side feed. With regard to the kneading temperature, it is preferred to be set at a temperature between the melting point of the crystalline polyamide resin (A) which is a high melting point side and the temperature which is higher than said melting point by 50° C. The kneading time is preferred to be about 0.5 to 15 minute (s).

The crystalline polyamide resin composition of the present invention is most suitable as a material for door checker parts for automobiles. In a door checker for automobiles, sliding durability upon opening and closing of automobile door for 100,000 times or more is necessary together with mechanical strength and shock resistance. It is particularly necessary that friction and abrasion upon repeated slidings are small whereby smooth opening and closing of the door can be done with constant force at all times and that the mechanical characteristics resulting in neither breakage nor deformation even upon application of abnormal force is achieved. In addition, since a door checker usually has a part shape into which metal is inserted, its close adhesion to metal parts and its moldability are also very important. The crystalline polyamide resin composition of the present invention can satisfy the severely demanded characteristics as such. Accordingly, it is most suitable as a material for a door checker for automobiles.

EXAMPLES

As hereunder, the present invention will be more specifically illustrated by referring to Examples although the present invention is not limited to those Examples.

Raw materials used in Examples and Comparative Examples of the present invention are as mentioned below.

Crystalline Polyamide Resins (A) and (B) (RV is Relative Viscosity.)

A1: Polyamide 66 (RV=4.5) Ultramid A5 (manufactured by BASF), melting point: 266° C.

A2: Polyamide 66 (RV=3.7) Amilan CM 3036 (manufactured by Toray), melting point: 265° C.

A3: Polyamide 66 (RV=3.2) EPR32 (manufactured by Shanghai Shinba Sakuryo Kagijutsu Co., Ltd.), melting point: 265° C.

A4: Polyamide 66 (RV=2.8) Amilan CM 3001N (manufactured by Toray), melting point: 265° C.

B1: Polyamide 6 (RV=3.5) Toyobo Nylon T-850 (manufactured by Toyobo), melting point: 234° C.

B2: Polyamide 6 (RV=3.1) Toyobo Nylon T-820 (manufactured by Toyobo), melting point: 233° C.

B3: Polyamide 6 (RV=2.5) Toyobo Nylon T-800 (manufactured by Toyobo), melting point: 233° C.

Modified Polyolefin Resin (C)

C: Polyethylene modified with maleic anhydride, Modic DH 0200 (manufactured by Mitsubishi Chemical)

Carbon Fiber (D)

D1: Chopped strand of carbon fiber bundles wherein fiber diameter is 7 μm, cut length is 6 mm and tensile strength is 4.9 GPa, AXE-4MC manufactured by Nippon Polymer Sangyo D2: Chopped strand of carbon fiber bundles wherein fiber diameter is 5.5 μm, cut length is 6 mm and tensile strength is 5.5 GPa, AXE-4MC HS manufactured by Nippon Polymer Sangyo Other Reinforcing Materials Glass fiber: T-275H manufactured by Nippon Electric Glass Wollastonite: FPW 800 manufactured by Kinsei Matec Styrene-Glycidyl Methacrylate Copolymer (E)

E1: Styrene-glycidyl methacrylate copolymer containing 6 to 10 molar % of glycidyl methacrylate, Alfon UG 4050 manufactured by Toagosei E2: Styrene-glycidyl methacrylate copolymer containing 14 to 18 molar % of glycidyl methacrylate, Alfon UG 4070 manufactured by Toagosei E3: Styrene-glycidyl methacrylate copolymer containing 23 to 27 molar % of glycidyl methacrylate, Joncryl ADR 4300S manufactured by BASF Examples 1 to 9, and Comparative Examples 1 to 8

Samples for evaluation were prepared in the following procedure. That is, the raw materials except the ingredient (D) were weighed in a compounding ratio for the crystalline polyamide resin composition shown in Tables 1 and 2, mixed using a tumbler and poured into a biaxial extruder. Temperature to be set for the biaxial extruder and kneading time were made 250° C. to 300° C. and 5 to 10 minutes, respectively. The ingredient (D) was directly added to melted resin using a side feed. Various samples for evaluation were molded from the resulting pellets using an injection molding machine. Cylinder temperature and metal die temperature of the injection molding machine were set to 280° C. to 300° C. and 60° C., respectively.

Methods for the evaluation of various characteristics are as follows. Results of the evaluation are shown in Tables 1 and 2.

1. Relative Viscosity of Polyamide Resin (a Method Using 96% Sulfuric Acid Solution)

Measurement was conducted using Ubbelohde's viscometer at 25° C. using a 96% by mass sulfuric acid solution with the polyamide resin concentration of 1 g/dl.

2. Specific Gravity

Measurement was conducted in accordance with JIS Z 8807.

3. Melting Point of Polyamide Resin

Measurement was conducted using Exstar 6000 (a differential scanning calorimeter of Seiko Instruments) with a temperature rising rate of 20° C./minute to determine endothermic peak temperature.

4. Bending Strength and Elastic Modulus in Bending

Measurement was conducted in accordance with ISO 178.

5. Sliding Durability (Surface Appearance)

Door check arm for automobiles was molded and subjected to reciprocating opening/closing tests for 30,000 times against a material to be slid which was a check case containing a shoe molded from polyacetal (AW 09 which was polyacetal manufactured by Polyplastics). The tests were conducted under such a condition wherein the maximum load upon pulling out the door check arm was 800 N and the load to the door check arm of the polyacetal shoe was 700 N. Evaluation was done in terms of appearance change between the first test and the 30,000th test. Specifically, evaluation by naked eye was conducted for the rough surface in the appearance of the slid surface. When no big change was noted, it was judged as "passed" (o) while, when changes such as rough surface were noted, it was judged as "rejected" (x).

6. Hardness

When the elastic modulus in bending was 3.0 GPa or more, it was judged to be "passed" (o) while, when it was less than 3.0 GPa, it was judged to be "rejected" (x).

7. Total Evaluation

When specific gravity was 1.20 or less, bending strength was 100 MPa or more, sliding durability was (o) and hardness was (o), the total evaluation was judged to be (o) while, if any of them was not satisfactory, it was judged to be (x).

TABLE 1

| | | | Example 1 | Example 2 | Example 3 | Example 4 | Example 5 | Example 6 | Example 7 | Example 8 | Example 9 |
|---|---|---|---|---|---|---|---|---|---|---|---|
| (A) | Polyamide 66 (A1) RV = 4.5 | % | 93.5 | | | | | 74.5 | 69 | 51.5 | |
| | Polyamide 66 (A2) RV = 3.7 | % | | 93.5 | | | | | | | 73.5 |
| | Polyamide 66 (A3) RV = 3.2 | % | | | 93.5 | 93.5 | 93.5 | | | | |
| | Polyamide 66 (A4) RV = 2.8 | % | | | | | | | | | |
| (B) | Polyamide 6 (B1) RV = 3.5 | % | | | | | | | | | |
| | Polyamide 6 (B2) RV = 3.1 | % | | | | | | | 20 | 40 | 20 |
| | Polyamide 6 (B3) RV = 2.5 | % | | | | | | 20 | | | |
| (C) | Modified polyethylene | % | 2.5 | 2.5 | 2.5 | 2.5 | 2.5 | 2.5 | 5 | 2.5 | 2.5 |
| (D) | Carbon fiber (D1) | % | 4 | 4 | 4 | 4 | 4 | | | 6 | 4 |
| | Carbon fiber (D2) | % | | | | | | 3 | 6 | | |
| | Glass fiber | % | | | | | | | | | |
| | Wollastonite | % | | | | | | | | | |
| (E) | Copolymer (E1) | Phr | | | | 2.5 | | | | | |
| | Copolymer (E2) | Phr | | | | | 1.5 | | | | |
| | Copolymer (E3) | Phr | | | | | 0.8 | | | | |
| Characteristics of molded product | Specific gravity | — | 1.15 | 1.15 | 1.15 | 1.15 | 1.15 | 1.15 | 1.15 | 1.15 | 1.15 |
| | Bending strength | MPa | 170 | 174 | 171 | 175 | 173 | 189 | 201 | 185 | 172 |
| | Elastic modulus in bending | GPa | 5.0 | 4.8 | 4.9 | 5.1 | 5.0 | 6.0 | 7.2 | 6.5 | 5.2 |
| | Sliding durability (surface appearance) | | o | o | o | o | o | o | o | o | o |
| | Hardness (elastic modulus in bending) | | o | o | o | o | o | o | o | o | o |
| | Total evaluation | | o | o | o | o | o | o | o | o | o |

* In the Table, (%) means % by mass in the polyamide resin composition.
(Phr) means parts by mass to 100 parts by mass of total of the ingredients (A), (B), (C) and (D).

TABLE 2

| | | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|
| (A) | Polyamide 66 (A1) RV = 4.5 | % | | 77.5 | | 100 | | | | |
| | Polyamide 66 (A2) RV = 3.7 | % | 97.5 | | 67.5 | | 100 | 95 | | 82.5 |
| | Polyamide 66 (A3) RV = 3.2 | % | | | | | | | | |
| | Polyamide 66 (A4) RV = 2.8 | % | | | | | | | 93.5 | |
| (B) | Polyamide 6 (B1) RV = 3.5 | % | | | 20 | | | | | |
| | Polyamide 6 (B2) RV = 3.1 | % | | | | | | | | |
| | Polyamide 6 (B3) RV = 2.5 | % | | 20 | | | | | | |
| (C) | Modified polyethylene | % | 2.5 | 2.5 | 2.5 | | | | 2.5 | 2.5 |
| (D) | Carbon fiber (D1) | % | | | | | | 5 | 4 | |
| | Carbon fiber (D2) | % | | | | | | | | |
| | Glass fiber | % | | | | | | | | 15 |
| | Wollastonite | % | | | 10 | | | | | |
| (E) | Copolymer (E1) | Phr | | | | | | | | |
| | Copolymer (E2) | Phr | | | | | | | | |
| | Copolymer (E3) | Phr | | | | | | | | |

TABLE 2-continued

|  |  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|
| Characteristics of molded product | Specific gravity | — | 1.14 | 1.14 | 1.19 | 1.14 | 1.14 | 1.15 | 1.15 | 1.24 |
|  | Bending strength | MPa | 80 | 81 | 88 | 83 | 85 | 180 | 171 | 170 |
|  | Elastic modulus in bending | GPa | 2.2 | 2.2 | 2.4 | 2.3 | 2.3 | 5.8 | 4.9 | 5.4 |
|  | Sliding durability (surface appearance) |  | X | X | X | X | X | X | X | X |
|  | Hardness (elastic modulus in bending) |  | X | X | X | X | X | ○ | ○ | ○ |
|  | Total evaluation |  | X | X | X | X | X | X | X | X |

\* In the Table, (%) means % by mass in the polyamide resin composition.
(Phr) means parts by mass to 100 parts by mass of total of the ingredients (A), (B), (C) and (D).

In all of Examples 1 to 9, specific gravity was nearly the same as that of the composition containing no reinforcing material. Elastic modulus in bending was 3 GPa or more, which means improvement of hardness. Further, sliding durability, etc. were good.

In Examples 6 and 7 which are compositions using carbon fiber of small diameter, bending strength and elastic modulus in bending become high proportionally to the adding amount of the carbon fiber. They also cleared the evaluating criteria for the sliding durability.

Example 7 is a composition wherein the adding amount of modified polyethylene was increased together with the amount of carbon fiber. In Example 7, all of physical properties and sliding durability were good.

On the contrary, Comparative Examples 1 and 2 are the compositions solely consisting of polyamide 66 and modified polyethylene. They showed low elastic modulus and, in a checker durability test with high load setting, durability was insufficient.

In Comparative Examples 3 and 8, a reinforcing agent was added to increase the hardness but, specific gravity became large in any of them. Also, addition of wollastonite resulted in no substantial increase in elastic modulus. Although addition of glass fiber increased the elastic modulus, the result was bad in the durability test.

Comparative Examples 4 and 5 are the examples wherein highly viscous polyamide 66 was used and neither carbon fiber nor polyethylene was contained therein. In those cases, elastic modulus was low and durability was bad as well.

Comparative Example 7 is an example wherein viscosity of polyamide 66 is low and Comparative Example 6 is an example wherein no modified polyethylene was added. Both Comparative Examples 7 and 6 were rejected in a checker durability test.

INDUSTRIAL APPLICABILITY

The present invention can provide a crystalline polyamide resin composition having low specific gravity and excellent sliding durability and being non-deformed even by high load, without deteriorating excellent mechanical characteristics, thermal resistance and resistance to chemicals which are inherent to a crystalline polyamide resin. Particularly, in the crystalline polyamide resin composition of the present invention, changes in surface appearance against repeated slidings for tens of thousands times with high load are small whereby it is most suitable as door checker parts for automobiles.

Moreover, the crystalline polyamide resin composition of the present invention can be used in broad fields as sliding parts for mechanism such as gear and bush in automobiles and electric field which requires repeated slidings with high load. Accordingly, the present invention greatly contributes in industry.

The invention claimed is:

1. A crystalline polyamide resin composition, characterized in that,
    to 100 parts by mass of a crystalline polyamide resin consisting of 50 to 100% by mass of a crystalline polyamide resin (A) wherein relative viscosity measured in 96% sulfuric acid is 3.0 or more and 50 to 0% by mass of a crystalline polyamide resin (B) wherein melting point is lower than melting point of the crystalline polyamide resin (A) by 20° C. or more and relative viscosity measured in 96% sulfuric acid is 3.6 or less, followings are compounded:
    1 to 10 part(s) by mass of a modified polyolefin resin (C) having a reactive functional group capable of reacting with terminal group and/or main chain amide group of the polyamide resin, 1 to 8 part(s) by mass of carbon fiber (D) and 0 to 5 part(s) by mass of a styrene-glycidyl methacrylate copolymer (E); and
    wherein the crystalline polyamide resin composition does not contain wollastonite.

2. The crystalline polyamide resin composition according to claim 1, wherein the modified polyolefin resin (C) having a reactive functional group capable of reacting with terminal group and/or main chain amide group of the polyamide resin is a modified polyethylene resin.

3. The crystalline polyamide resin composition according to claim 1, wherein the composition is used for a door checker.

* * * * *